US012623165B2

(12) United States Patent
Mustakangas et al.

(10) Patent No.: US 12,623,165 B2
(45) Date of Patent: May 12, 2026

(54) FILTER PLATE ASSEMBLY FOR A HORIZONTAL PLATE AND FRAME-TYPE FILTER, SUCH AS A TOWER PRESS, A FILTER PLATE AND A VAT LINER

(71) Applicant: Metso Findland Oy, Espoo (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vänttinen, Espoo (FI)

(73) Assignee: Metso Finland Oy, Espoo (FI)

( * ) Notice: Subject to any disclaimer, the term of this patent is extended or adjusted under 35 U.S.C. 154(b) by 487 days.

(21) Appl. No.: 17/920,308

(22) PCT Filed: Jun. 3, 2020

(86) PCT No.: PCT/FI2020/050389
§ 371 (c)(1),
(2) Date: Oct. 20, 2022

(87) PCT Pub. No.: WO2021/245321
PCT Pub. Date: Dec. 9, 2021

(65) Prior Publication Data
US 2023/0201746 A1 Jun. 29, 2023

(51) Int. Cl.
*B01D 25/21* (2006.01)
*B01D 25/164* (2006.01)

(52) U.S. Cl.
CPC ....... *B01D 25/215* (2013.01); *B01D 25/1645* (2013.01)

(58) Field of Classification Search
CPC ............. B01D 25/215; B01D 25/1645; B01D 25/164; B01D 25/21; B01D 25/30
See application file for complete search history.

(56) References Cited

U.S. PATENT DOCUMENTS 220,686 A * 10/1879 Wegelin ............... B01D 25/215
                                                    210/227
4,749,482 A 6/1988 Bonn
(Continued)

FOREIGN PATENT DOCUMENTS

CN 103055558 B 8/2015
CN 204671950 U * 9/2015
(Continued)

OTHER PUBLICATIONS

European Search Report for European Patent Application No. 20938772.9, completed Jan. 12, 2024.
(Continued)

*Primary Examiner* — Liam Royce
(74) *Attorney, Agent, or Firm* — Andrus Intellectual Property Law, LLP

(57) ABSTRACT

A filter plate assembly which is resistant to both wear and deformation caused by creeping, while facilitating maintenance thereof. A filtrate vat is provided that is formed on, and integral with the filter plate, in addition to a separate, replaceable vat liner. In this way, a rigid structure of the filtrate vat capable of resisting deformation may be achieved, while the vat liner separates the filtrate from the filtrate vat and the associated filter plate, providing wear resistance and facilitating maintenance. The present disclosure further concerns the filter plate and the filtrate vat.

16 Claims, 4 Drawing Sheets

(56)                    References Cited

U.S. PATENT DOCUMENTS

| | | | | |
|---|---|---|---|---|
| 6,365,043 | B1 * | 4/2002 | Haberle | ............... B01D 25/285 |
| | | | | 210/231 |
| 6,716,347 | B1 * | 4/2004 | Davis | ................... B01D 25/285 |
| | | | | 210/231 |
| 2005/0247616 | A1 * | 11/2005 | Salbaum | .............. B01D 25/215 |
| | | | | 210/231 |
| 2020/0147522 | A1 | 5/2020 | Hermann et al. | |

FOREIGN PATENT DOCUMENTS

| | | | |
|---|---|---|---|
| CN | 210057503 | U | 2/2020 |
| ES | 2359771 | T3 | 5/2011 |
| WO | 2017162924 | A1 | 9/2017 |

OTHER PUBLICATIONS

International Search Report and Written Opinion for International Application No. PCT/FI2020/050389, mailed Nov. 4, 2020.

* cited by examiner

FILTER PLATE ASSEMBLY FOR A HORIZONTAL PLATE AND FRAME-TYPE FILTER, SUCH AS A TOWER PRESS, A FILTER PLATE AND A VAT LINER

CROSS-REFERENCE TO RELATED APPLICATIONS

This application is the U.S. national stage application of International Application PCT/FI2020/050389, filed Jun. 3, 2020, which international application was published on Dec. 9, 2021, as International Publication WO 2021/245321 A1 in the English language.

FIELD OF THE DISCLOSURE

The present disclosure relates to horizontal plate and frame-type filters, such as tower presses, and more particularly to a filter plate assembly for such a filter. The present disclosure further concerns a filter plate and a vat liner for such a filter plate assembly.

BACKGROUND OF THE DISCLOSURE

Conventionally in horizontal filter plate and frame-type filters, such as tower presses, a filtrate is collected to a filtrate vat from a filter chamber formed above the vat. As the filtrate typically contains small solid particles, the filtrate flow (and a possible drying air flow) is abrasive over numerous repeated filtration cycles. To this end, the filtrate vat has conventionally been provided as a separate, replaceable component, made of a material able to sufficiently withstand wear caused by the abrasive flow. In known arrangements, the filtrate vat has been provided as component forming a receptacle for receiving the filtrate and has been placed on top of a substantially flat filter plate. When the filtrate vat has worn excessively, it is replaced.

However, it has been noticed, that such a wear resistant separate filtrate vat is prone to creeping under as it is repetitively compressed over numerous filtration cycles. Moreover, it has not been generally considered that changing the material of the filtrate vat so as to better resist deformation due to creeping would result in unsatisfactory wear-resistance characteristics.

It has also been noted that conventional, separate filtrate vats have faced issues related to contamination from the slurry to be filtered and other process fluids. Particularly, slurry that has reached the interface between the filter plate and the filtrate vat may travel underneath the filtrate vat due to the capillary effect and the repetitive compression of the filtration cycles. Such impurities cause a bulge on the otherwise flat filter plate, thereby leading to premature wear of the filtrate vat and even breakage thereof. Moreover, slurry or other process fluid contamination may seize fasteners used to attach the filtrate vat to the filter plate, thereby hindering the maintenance of the associated filter, such as replacement of the filtrate vat.

BRIEF DESCRIPTION OF THE DISCLOSURE

An object of the present disclosure is to provide a filter plate assembly, a filter plate and a vat liner, which are resistant to both wear and deformation caused by creeping, while facilitating maintenance.

The object of the disclosure is achieved by the filter plate assembly, the filter plate and the vat liner which are characterized by what is stated in the independent claims. The preferred embodiments of the disclosure are disclosed in the dependent claims.

The disclosure is based on the idea of providing the filtrate vat formed on, and integral with the filter plate, in addition to a separate, replaceable vat liner. In this way, a rigid structure of the filtrate vat capable of resisting deformation may be achieved, while the vat liner separates the filtrate from the filtrate vat and the associated filter plate, providing wear resistance and facilitating maintenance.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figures 1, 2:
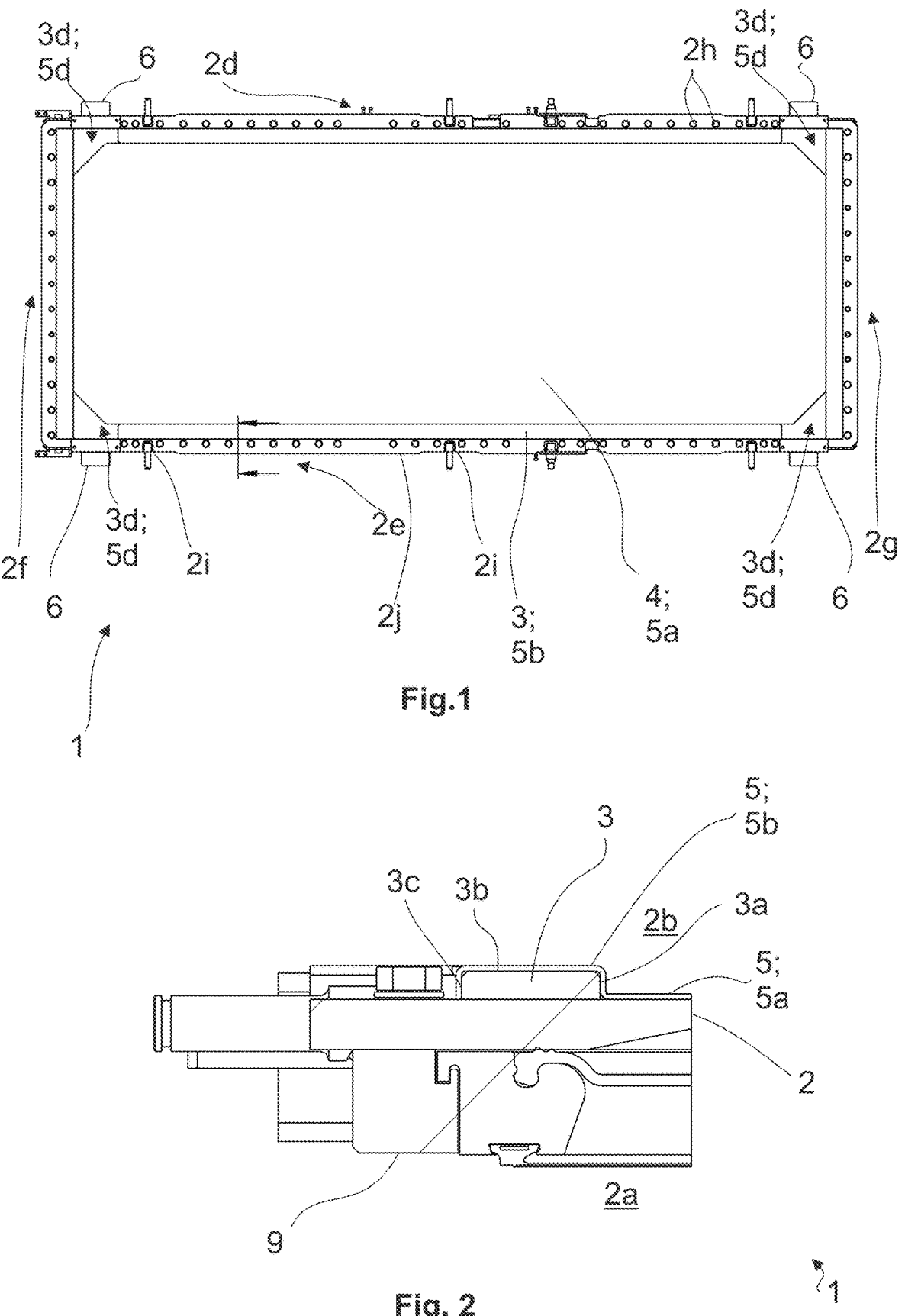
FIG. 1 illustrates a plan view of a filter plate assembly according to an embodiment of the present invention.
FIG. 2 illustrates a cross-sectional cut view along the cut line illustrated in FIG. 1.

According to a first aspect of the present disclosure, a filter plate assembly 1 for a horizontal plate and frame-type filter, such as a tower press, is provided.

The filter plate assembly comprises a filter plate 2 having a rigid plate-like body. The filter plate 2 has a frame side 2a and a vat side 2b. The frame side 2a is intended to face towards a plate frame 9, on which the filter plate is supported, when in use, whereas the vat side 2b refers to the side of the filter plate 2, on which a filtrate vat 4 is formed, and is intended to face towards a filter chamber formed by the filter plate assembly 1 together with an adjacent filter plate assembly above. When in use, a filter plate assembly 1 is separated from an adjacent filter plate assembly above, with which a closed filter chamber is formed, with a filter medium (typically a filter cloth), such that slurry is fed into the filter chamber of the filter plate assembly 1 above, and filtrate separated from the slurry by the cloth is received in the filtrate vat 4 of the filter plate assembly 1 below.

The filter plate 2 comprises, on the chamber 2*b* side, a border 3 having at least an inner lateral wall 3*a* and an upper surface 3*b*. The border 3 is elevated for a distance at least from a portion of the filter plate 2 delimited within the border 3. Particularly, the border 3 is formed integral with the filter plate 2.

Particularly, a filtrate vat 4 is formed by the filter plate 2, such that the inner lateral wall 3*a* of the border forms a lateral wall of the filtrate vat 4, and a portion of the filter plate delimited by the border 3 forms a bottom of the filtrate vat 4. That is, a receptacle for receiving filtrate is formed by the shape of the filter plate 2 itself.

For example, the filter plate 2 may be provided in accordance with the third aspect of the present disclosure.

The filter plate assembly 1 further comprises a vat liner 5 having a sheet-like body. The vat liner 5 is nested within the filtrate vat 4 such that the vat liner 5 extends onto the upper surface 3*b* of the border 3, so that the filter plate 2 is separated from filtrate within the filtrate vat 4 by the vat liner 5, when in use. That is, the vat liner 5 extends along lateral inner wall 3*a* of the border 3.

For example, the vat liner 5 may be provided in accordance with the third aspect of the present disclosure.

In this way, the filter plate 2 may be constructed so as to provide a rigid structure forming the shape of the filtrate vat 4 being able to resist deformation due to creeping, while the vat liner 5 shield the filtrate vat 4 from wear caused by abrasion, as discussed earlier. Furthermore, as the vat liner 5 is much lighter, as compared to a conventional separate filtrate vat, maintenance is facilitated as manipulating the vat liner 5 is easier and the whole filter plate does not ned to be removed from the associated filter apparatus.

Preferably, but not necessarily, the vat liner 5 also extends over the upper surface 3*b* of the border 3.

Most suitably, the filter plate 2 is of a more rigid material 5, and able to better resist creeping than the vat liner 5, whereas the vat liner 5 is of a more wear resistant material than the filter plate 2.

Examples of such materials of the filter plate 2 include, but are not limited to, metals, such as steel, FRP (fibre-reinforce plastics) materials, such as reinforced composite materials with a thermoset or thermoplastic matrix, and thermoset materials. Correspondingly, examples of such materials of the vat liner 5 include, but are not limited to, wear resistant polymers, such as thermoplastics including thermoplastic vulcanizates and thermoplastics elastomers, PUR and rubber.

It should be noted that a plate frame 9 for supporting the filter plate 2 may be included in the filter plate assembly 1. Alternatively, the filter frame 9 may be provided as a separate component or assembly attachable to the filter plate assembly 1.

In an embodiment according to the first aspect of the present disclosure, the border 3 has an outer lateral wall 3*c*, and the vat liner 5 additionally extends onto the lateral outer wall 3*c*.

In this kind of arrangement, slurry or other process fluids are less likely to travel between the vat liner 5 and the filter plate 5 all the way to the filtrate vat 4 or even the upper surface 3*b* of the border 3, where contamination may cause excess wear or even breakage under repetitive compression, as discussed above. This facilitates maintenance as the maintenance intervals can be extended.

Furthermore, a more rigid structure of the vat liner 5 itself is achieved, which facilitates maintenance, as the vat liner 5 deforms less during installation and is easier to be seated in the filtrate vat 4.

Most suitably, but not necessarily, the vat liner 5 extends over the outer lateral wall 3*c* of the border 3. This further improves the benefits mentioned above, as slurry or other process fluids must travel even further to reach areas where contamination may cause issues.

For example, a trough 5*c* may be formed on the vat liner 5, the through 5*c* running along the perimeter thereof of the vat liner 5. Moreover, the border 3 is then nested within the trough 5*c*, and an inside of the trough 5*c* is hollow and the border 3 is solid. This kind of structure further allows the border formed 3 by the filter plate 2 to be load bearing against the forces required to close a filter chamber (i.e. adjacent filter plate assemblies being pressed against each other), while the vat liner 5 merely acts as a covering or coating separating the filtrate from the filter plate 2. Additionally, the border 3 being seated in the trough further secures the vat liner to the filter plate 2.

Furthermore, the trough 5*c* of the vat liner 4 together with the border 3 acts as a guide rail during installation of the vat liner 5, thereby facilitating maintenance.

In an embodiment according to the first aspect of the present disclosure, a gap 3*d* is provided on the border 3, such that an outlet opening extending laterally through the border 3 is formed, thereby providing a fluid drainage route from the filtrate vat 4.

As the drainage route from the filtrate vat 4 runs laterally, maintenance is facilitated, as the drainage rout is easily accessible, as compared to a structure in which the drainage route runs vertically through the filter plate.

Preferably, but not necessarily, the vat liner 5 is formed so as to extend into the outlet opening, and to cover the border 3 adjacent to the outlet opening, such that the filter plate 2 is separated from filtrate within the outlet opening by the vat liner 5, when in use. This further helps prevent contamination of filtrate running through the outlet opening from travelling under the vat liner 5.

Preferably, but not necessarily, on the vat side 2*b* of the filter plate 2, a recessed portion 2*c* of the filter plate situated at the outlet opening is recessed with respect the bottom of the filtrate vat 4. Moreover, the vat liner 5 is spaced apart from the filter plate 2 at the recessed portion 2*c* in a direction transverse to the general planarity of the filter plate 2.

In this kind of structure, the vat liner 5 forms an overhang at the outlet opening, thereby preventing filtrate contamination from travelling under the vat liner 5, between the vat liner 5 and the filter plate 2.

Preferably, but not necessarily, the filter plate assembly 1 further comprises a removably fixed outlet piece 6 at least partly nested within the outlet opening. Moreover, the outlet piece 6 is being arranged such that the fluid drainage route runs therethrough.

This facilitates maintenance, as the outlet piece 6 can be replaced separately—the outlet piece is commonly subjected to most wear due abrasion of the filtrate and/or drying air flow.

Suitably, also the outlet piece 6 is of a creeping-resistant material, as creeping is particularly prominent at the outlet piece due to the physical discontinuity in the physical structure of the filter plate 2. Examples of such materials of the filter plate 2 include, but are not limited to, metals, such as steel, FRP (fibre-reinforce plastics) materials, such as reinforced composite materials with a thermoset or thermo-plastic matrix, and thermoset materials.

The outlet piece may suitably be coated with a wear-resistant material to protect it from premature wear caused by the filtrate or drying air flow. Examples of such materials include, but are not limited to, wear resistant polymers, such as thermoplastics including thermoplastic vulcanizates and thermoplastics elastomers, PUR and rubber.

Furthermore, using separate outlet pieces 6 enables using differently constructed outlet pieces for different types of filtrates, depending on the application. For example, the outlet piece can be shaped so as to optimize the flow characteristics thereof for a certain kind of filtrate.

More preferably, the vat liner 5 extends into the outlet piece 6. This ensures, that the vat liner 5 can be sealed against outlet piece 6 and minimizes risk of contamination from filtrate, slurry, or other process liquids between the vat liner 5 and the filter plate 2. Moreover, the one or more outlet pieces 6 can be used to secure the vat liner 5 in place, such that no other separate fasteners are required. This facilitates maintenance, as the fasteners or fixing elements securing the filtrate vat 5 are situated only in wearing parts (i.e., the outlet piece 6) which will be replaced along with the filtrate vast 5.

More preferably, the outlet piece 6 comprises a base 7 and a lid 8. The base 7 is at least partly nested within the recessed portion 2c of the filter plate 2, between the filter plate 2 and the vat liner 5. The lid 8, in turn, is provided on an opposite side of the vat liner 5 with respect to the base.

The base 7 is removably fixed to the remaining filter plate assembly 1, for example to either or both of the filter plate 2 and the plate frame 9 supporting the filter plate, whereas the lid 8 is a removably fixed to the base 7, such that the vat liner 5 is clamped between the base 7 and the lid 8. In this way, the filtrate drainage route is formed between the vat liner 5 and the lid 8, while a sealed attachment between the outlet piece 6 and the vat liner 5 is achieved, thereby reducing filtrate contamination form travelling under between the vat liner 5 and the filter plate 2.

Most preferably, the base 7 of the outlet piece 6 comprises a recessed seat 7a into which a gap portion 5d of the vat liner 5, corresponding to a gap 3d of the border 3, is seated.

Furthermore, the lid 8 comprises a plurality of spaced apart ribs 8a projecting towards the recessed seat 7a, such that the vat liner 5 is clamped between the recessed seat 7a and the ribs 8a, and is sealed against the recessed seat 7a. The lid 8 extends over the gap 4 and seals against the border portion 5b of the liner 5 at a position corresponding to the upper surface 3b of the border 3. Such an arrangement ensures a secure and sealed attachment between the vat liner 5 and the outlet piece 6.

For example, the base 7 may further comprises a recessed chute 7b as a continuation of the recessed seat 7a for conducting filtrate out of the outlet piece 6.

Preferably, but not necessarily, the filter plate 2 is of a generally rectangular shape having a first flank side 2d and a second flank side 2e parallel to the first flank side 2d, and a first end side 2f and a second end side 2g parallel to the first end side 2f. Moreover, the first and second end sides 2f, 2g extend in a direction transverse to a direction in which the first and second flank sides 2d, 2e extend, and the first and second flank sides 2d, 2e have a length greater than that of the first and second end sides 2f, 2g.

In such a case, one or more gaps 3d of the border 3 are formed on either or both of the first flank side 2d and the second flank side 2e.

The first and second flank sides 2d, 2e are considered preferred positions for the gaps 3d, as this provides easiest access for maintenance (e.g. replacing outlet pieces 6).

More preferably, one or more gaps 3d of the border 3 are formed in a corner region between a flank side 2d, 2e and an end side 2f, 2g. The corner regions are considered particularly preferred positions for the gaps 3d, as this additionally provides most secure attachment of the filtrate vat 5, when it is attached to the filter plate 2 using outlet pieces 6.

More preferably, the filter plate comprises one or more lateral indentation portion 2i provided on either or both of the first flank side 2d and the second flank side 2e. Such lateral indentation portions 2i are arranged to circumvent suspension elements and/or support elements of a filter plate frame 9 on which the filter plate 2 is supported.

Such an arrangement facilitates maintenance by allowing the filter plate 2 to be removed from a plate frame 9 on which it is supported without removing the plate frame 9 from the filter apparatus.

The filter plate 2 may additionally comprise one or more lateral widening portions 2j provided on either or both of the first flank side 2d and the second flank side 2e. The lateral widening 2j portions are arranged between lateral indentation portions 2i adjacent to the widening portion 2j. Moreover, the lateral widening portions 2j are arranged to laterally overhang a filter plate frame 9 supporting the filter plate 2.

Such an arrangement further facilitates maintenance by allowing the filter plate 2 to be lifted at the lateral widening portions 2j.

In an embodiment according to the first aspect of the present disclosure, the filter plate 2 comprises a plurality of attachment holes 2h running along the periphery of the filter plate 2 and extending therethrough. The attachment holes 2h are situated on an outer side of the border 3 with respect to the filtrate vat 4, such that the attachment holes 2h are not in contact with filtrate within the filtrate vat, when in use.

Such an arrangement facilitates maintenance, as the attachment holes, through which the filter plate 2 is attached to the plate frame 9 are less like to be contaminated form slurry, filtrate ort other process fluids. Consequently, any fasteners used for attaching the filter plate to the plate frame are less likely to seize.

It should be noted that the first aspect of the present disclosure encompasses any combination of two or more embodiments, or variants thereof, in accordance with the above.

According to a second aspect of the present disclosure, a filter plate 2 for a filter plate assembly 1 of a horizontal plate and frame-type filter, such as a tower press, is provided. The filter plate 2 has a rigid plate-like body with a frame side 2a and a vat side 2b. The frame side 2a is intended to towards a plate frame 9, on which the filter plate is supported, when in use, whereas the vat side 2b refers to the side of the filter plate 2 on which the filtrate vat 4 is formed, and is intended to face towards a filter chamber formed by the filter plate assembly together with an adjacent filter plate assembly above.

The filter plate 2 comprises, on the chamber 2b side, a border 3 having at least an inner lateral wall 3a and an upper surface 3b. The border 3 is elevated for a distance at least from a portion of the filter plate 2 delimited within border 3. Moreover, the border 3 is an integral part of the filter plate 2.

Preferably, but not necessarily, the filter plate 2 may have a vat area of between 1.5 m²-9 m². More preferably, but not necessarily, the filter plate 2 may have a vat area of between 2.5 m²-7 m². Most preferably, but not necessarily, the filter plate 2 may have a vat area of between 2.5 m²-7 m². In the context of this disclosure, the vat area is defined as the area of the portion of the filter plate 2 delimited by the border 3, i.e. the bottom of the filtrate vat.

Preferably, but not necessarily, the border, particularly the upper surface 3b thereof, may be elevated for a distance of at least 10 mm from the portion of the filter plate 2 delimited within the border. Preferably, but not necessarily, the border, particularly the upper surface 3b thereof, may be elevated for a distance of no more than 40 mm from the portion of the filter plate 2 delimited within the border. For example, the border, particularly the upper surface 3b thereof, may be elevated for a distance of 15-20 mm from the portion of the filter plate 2 delimited within the border.

Preferably but not necessarily, the border 3 has a width of at least 15 mm. Preferably, but not necessarily, the border has a width of no more than 200 mm. For example, the width of the border may be between 75 mm-100 mm. In the context of this disclosure, the width of the border 3 refers to a transverse dimension thereof parallel with the planar bottom 5a. Also, it should be noted, that the border may have different widths at different parts of the filter plate.

Particularly, a filtrate vat 4 is formed by the filter plate 2, such that the inner lateral wall 3a of the border forms a lateral wall of the filtrate vat 4, and a portion of the filter plate delimited by the border 3 forms a bottom of the filtrate vat 4. That is, a receptacle for receiving filtrate is formed by the shape of the filter plate 2 itself.

Preferably, but not necessarily, the filter plate 2 may have an average material thickness of between 8 mm-30 mm at the portion thereof delimited by the border 3.

In this way, the filter plate 2 may be constructed so as to provide a rigid structure forming the shape of the filtrate vat 4 being able to resist deformation due to creeping.

Most suitably, the filter plate 2 is of a rigid material 5 able to resist creeping. Examples of such materials of the filter plate 2 include, but are not limited to, metals, such as steel, FRP (fibre-reinforce plastics) materials, such as reinforced composite materials with a thermoset or thermoplastic matrix, and thermoset materials.

In an embodiment according to the second aspect of the present disclosure, the border 3 has an outer lateral wall 3c. In other words, the border 3 is also elevated with respect to an area of the filter plate 2 surrounding the border 3.

In an embodiment according to the second aspect of the present disclosure, a gap 3d is provided on the border 3, such that an outlet opening extending laterally through the border 3 is formed, thereby providing a fluid drainage route from the filtrate vat 4.

Preferably, but not necessarily, the one or more gaps 3d have a length of between 150 mm-300 mm in the longitudinal direction of an associated side 2d, 2e, 2f, 2g on which the gap 3d is situated.

Preferably, but not necessarily, the gap 3d has a height corresponding to that of the border 3.

Preferably, but not necessarily, on the vat side 2b of the filter plate 2, a recessed portion 2c of the filter plate situated at the outlet opening is recessed with respect the bottom of the filtrate vat 4. Moreover, the vat liner 5 is spaced apart from the filter plate 2 at the recessed portion 2c in a direction transverse to the general planarity of the filter plate 2.

Preferably, but not necessarily, the filter plate 2 is of a generally rectangular shape having a first flank side 2d and a second flank side 2e parallel to the first flank side 2d, and a first end side 2f and a second end side 2g parallel to the first end side 2f. Moreover, the first and second end sides 2f, 2g extend in a direction transverse to a direction in which the first and second flank sides 2d, 2e extend, and the first and second flank sides 2d, 2e have a length greater than that of the first and second end sides 2f, 2g.

In such a case, one or more gaps 3d of the border 3 are formed on either or both of the first flank side 2d and the second flank side 2e.

Preferably, but not necessarily, the length of the first and second flank sides 2d, 2e is between 1.5-3 times of that of the first and second end sides 2f, 2g, respectively More preferably, one or more gaps 3d of the border 3 are formed in a corner region between a flank side 2d, 2e and an end side 2f, 2g.

More preferably, the filter plate comprises one or more lateral indentation portions 2i provided on either or both of the first flank side 2d and the second flank side 2e. Such lateral indentation portions 2i are arranged to circumvent suspension elements and/or support elements of a filter plate frame 9 on which the filter plate 2 is supported. Such an arrangement facilitates maintenance by allowing the filter plate 2 to be removed from a plate frame 9 on which it is supported without removing the plate frame 9 from the filter apparatus.

The filter plate 2 may additionally comprise one or more lateral widening portions 2j provided on either or both of the first flank side 2d and the second flank side 2e. The lateral widening 2j portions are arranged between lateral indentation portions 2i adjacent to the widening portion 2j. Moreover, the lateral widening portions 2j are arranged to laterally overhang a filter plate frame 9 supporting the filter plate 2.

Such an arrangement further facilitates maintenance by allowing the filter plate 2 to be lifted at the lateral widening portions 2j.

In an embodiment according to the second aspect of the present disclosure, the filter plate 2 comprises a plurality of attachment holes 2h running along the periphery of the filter plate 2 and extending therethrough. The attachment holes 2h are situated on an outer side of the border 3 with respect to the filtrate vat 4, such that the attachment holes 2h are not in contact with filtrate within the filtrate vat, when in use.

Such an arrangement facilitates maintenance, as the attachment holes, through which the filter plate 2 is attached to the plate frame 9 are less like to be contaminated form slurry, filtrate ort other process fluids. Consequently, any fasteners used for attaching the filter plate to the plate frame are less likely to seize.

It should be noted that the second aspect of the present disclosure encompasses any combination of two or more embodiments, or variants thereof, in accordance with the above.

According to a third aspect of the present disclosure, a vat liner 5 for a filter plate assembly 1 of a horizontal plate and frame-type filter, such as a tower press, is provided.

The vat liner 5 has a sheet-like body comprising a planar bottom portion 5a, and a border portion 5b. The border portion further comprises an inner lateral wall portion extending vertically from the planar bottom portion 5a, and an upper surface portion extending outwardly from the inner lateral wall portion in direction transverse thereto. That is, the upper surface portion is elevated from the planar bottom portion 5a.

Preferably, but not necessarily, the vat liner 5 may have a bottom area of between 1.5 m²-9 m². More preferably, but not necessarily, the vat liner 5 2 may have a bottom area of between 2.5 m²-7 m². Most preferably, but not necessarily, the vat liner 5 may have a bottom area of between 2.5 m²-7 m². In the context of this disclosure, the bottom area is defined as the area of bottom surface (i.e. the surface intended to sit against the filtrate vat 4) of the vat liner 5 corresponding to the bottom portion 5b.

Preferably, but not necessarily, the upper surface portion of the border portion 5b is parallel with the planar bottom portion 5a.

Preferably, but not necessarily, the upper surface of the border portion 5*b* is elevated at a height of between 10 mm-40 mm from the planar bottom portion 5*b*. For example, the upper surface of the border portion 5*b* may be elevated at a height of 15 mm from the planar bottom portion 5*b*.

Preferably but not necessarily, the border portion 5*b* has a width of at least 15 mm. Preferably but not necessarily, the border portion 5*b* has a width of no more than 200 mm. For example, the border portion 5*b* may have a width of between 75 mm-100 mm. In the context of this disclosure, the width of the border portion 5*b* refers to a transverse dimension thereof parallel with the planar bottom 5*a*.

Preferably, but not necessarily, the vat liner 5 may have, at the bottom portion 5*a* thereof, a material thickness of between 1 mm-10 mm, more preferably, but not necessarily, of between 2-5 mm. Preferably, but not necessarily, the vat liner 5 may have, at the border portion 5*b* thereof, a material thickness of between 1 mm-10 mm, more preferably, but not necessarily, of between 2-5 mm.

In an embodiment according to the third aspect of the present disclosure, the border portion 5*b* further comprises an outer lateral wall portion extending from the upper surface portion. The outer lateral wall portion extends vertically with respect to the planar bottom portion 5*a*. In such an arrangement, a hollow trough 5*c* is formed on the vat liner 5 by the border portion 5*b*, running along the perimeter thereof.

In this kind of arrangement, when the vat liner 5 is nested in a corresponding filtrate vat 4, slurry or other process fluids are less likely to travel between the vat liner 5 and the filter plate 5 all the way to the filtrate vat 4 or even the upper surface 3*b* of the border 3, where contamination may cause excess wear or even breakage under repetitive compression, as discussed above.

Furthermore, a more rigid structure of the vat liner 5 itself is achieved, which facilitates maintenance, as the vat liner 5 deforms less during installation and is easier to be seated in the filtrate vat 4.

In an embodiment according to the third aspect of the present disclosure, a gap portion 5*d* is formed on the border portion 5*b*, exhibiting a gap extending laterally through the border portion 5*b*. Moreover, the planar bottom portion 5*a* extends into the gap portion.

In this arrangement, a fluid drainage route from the planar bottom portion 5*a* is formed laterally through the border portion 5*b*.

Preferably, but not necessarily, the one or more gap portions 5*d* have a length of between 150 mm-300 mm in the longitudinal direction of an associated side portion 5*e*-5*h* on which the gap 5*d* is situated Preferably, but not necessarily, if a hollow trough 5*c* is formed on the vat liner 5, the trough 5*c* is closed towards the gap portion (5*d*).

In an embodiment according to the third aspect of the present disclosure, the vat liner 5 is of a generally rectangular shape having a first flank side portion 5*e* and a second flank side portion 5*f* parallel to the first flank side portion 5*e*, and a first end side 5*g* portion and a second end side portion 5*h* parallel to the first end side portion 5*g*.

The first and second end side portions 5*g*, 5*h* extend in a direction transverse to a direction in which the first and second flank side portions 5*e*, 5*f* extend. Moreover, the first and second flank side portions 5*e*, 5*f* have a length greater than that of the first and second end side portions 5*g*, 5*h*.

In such a configuration, one or more gap portions 5*d* of the border portion 5*b* are suitably formed on either or both of the first flank side portion 5*e* and the second flank side portion 5*f*.

When a new vat liner is installed during maintenance, the vat liner 5 is inserted in place between adjacent filter plates either end side portion 5*g*, 5*h* first due to the structure of the associated filter press. In other words, the vat liner 5 is handled and manipulated from the first and second flank portions 5*e*, 5*f*. Providing the gap portions 5*d* at either or both of the first and second flank portions 5*e*, 5*f* (instead of the end side portions 5*g*, 5*h*) ensures that an unbroken stiffened structure (i.e., trough 5*c*) is achieved at the end side portions 5*g*, 5*h*, thereby improving the vat liners 5 ability to resist deformation during installation, and thereby facilitating maintenance.

Preferably, the length of the first and second flank side portions 5*e*, 5*f* is 1.5-3 times that of the first and second end side portions 5*g*, 5*h*.

Preferably, but not necessarily, one or more gap 5*d* portions of the border 5*b* portion are formed in a corner region between a flank side portion and an end side portion.

It should be noted that the third aspect of the present disclosure encompasses any combination of two or more embodiments, or variants thereof, in accordance with the above.

FIG. 1 illustrates a plan view of a filter plate assembly according to an embodiment of the present invention. Particularly, FIG. 1 shows the filter plate assembly 1 as seen from the vat side 2*b*. The filter plate assembly has a filter plate 2 and a vat liner 5 placed on top the filter plate 2. The filter plate 2 is of a rectangular shape having a first flank side 2*d*, a second flank side 2*e*, a first end side 2*f* and a second end side 2*g*.

Outlet pieces 6 are placed at the first and second flank sides 2*d*, 2*e* at the corner regions between flank side 2*d*, 2*e* and the end sides 2*f*, 2*g*, where gaps 3*d* of the border 3 and the gap portions 5*d* of the vat liner 5 (covered by the outlet piece 6) are exhibited.

A filtrate vat 4 is formed in the central are of the filter plate 2, delimited by the border, and is covered by the vat liner 5

The flank sides 2*d*, 2*e* have intended portions 2*i*, which are laterally recessed with respect to adjacent portions of the filter plate, and widening portions 2*j*, which extend laterally further with respect to their adjacent portions. The widening portions 2*j* are provided between intended portion 2*i*, although other configurations are foreseeable. Attachment holes 2*h* can be seen extending around the periphery of the filter plate 2.

FIG. 2 illustrates a cross-sectional cut view along the cut line illustrated in FIG. 1 (i.e., running across the second flank side 2*e*). FIG. 2 illustrates the filter plate 2 being supported on a plate frame 9. Moreover FIG. 2 better illustrates the border 3 of the filter plate 2 having an inner lateral wall 3*a*, top surface 2*b* and an outer lateral wall 3*c*. The vat liner is seated on the filter plate such that the border portion 5*b* receives the border 3 and the bottom portion 5*a* is seated in the area are delimited by the border (i.e. the filtrate vat 4)

Figures 3, 4, 5, 6:
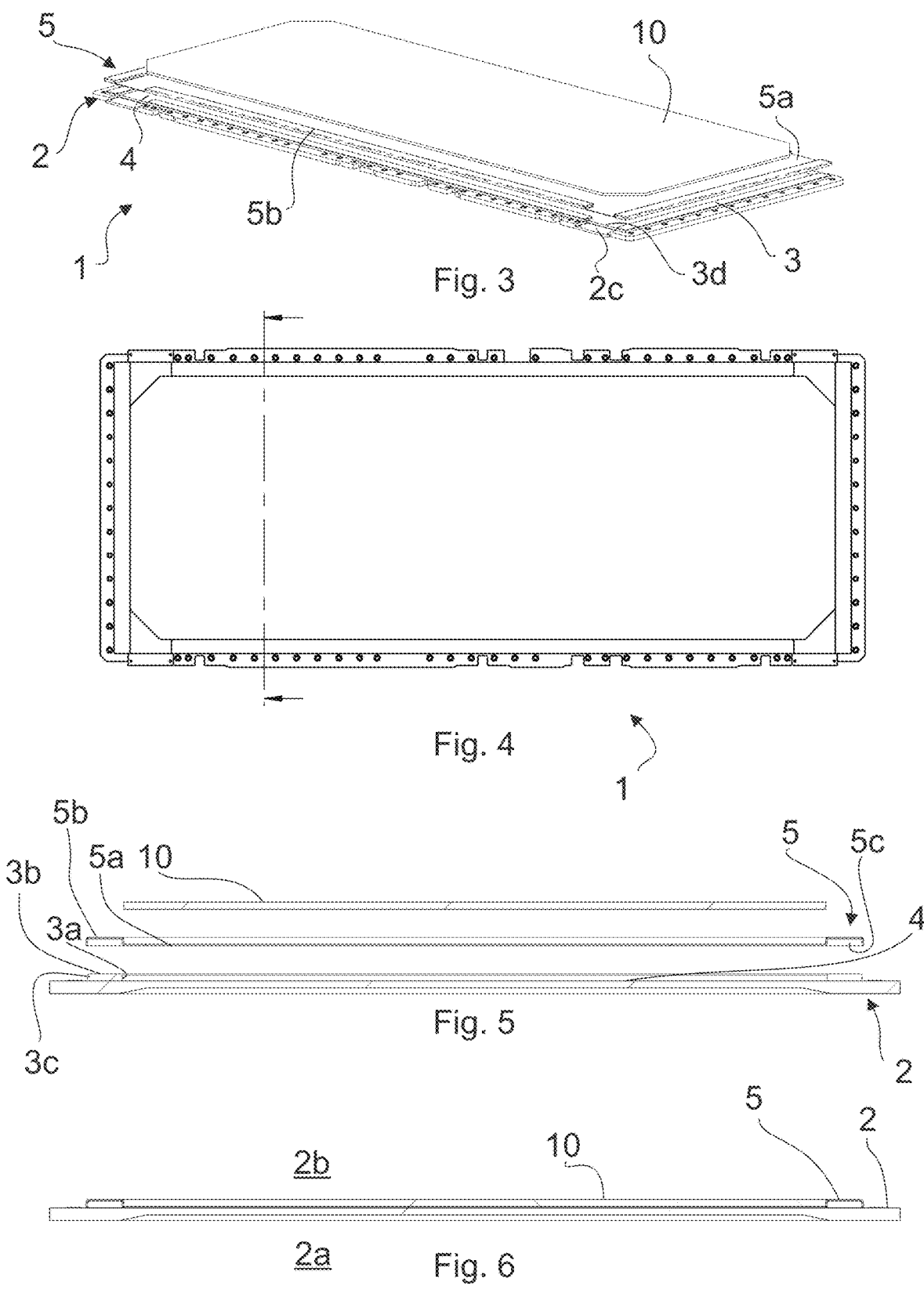
FIG. 3 illustrates a filter plate assembly similar to that of FIG. 1, without outlet pieces, and equipped with a filtrate vat, as seen as an exploded perspective view.
FIG. 4 illustrates the filter plate assembly of FIG. 3 as seen as a plan view.
FIG. 5 illustrates the filter plate assembly of FIG. 3 as an exploded cross section cut view along the dashed line illustrated in FIG. 4.
FIG. 6 illustrates the filter plate assembly of FIG. 3 as a cross section cut view along the dashed line illustrated in FIG. 4.

FIG. 3 illustrates a filter plate assembly 1 similar to that of FIG. 1, without outlet pieces 6, and equipped with a filtrate vat 5, as seen as an exploded perspective view. FIG. 3 also illustrates how a grid 10 is to be received in the filtrate vat covered by the vat liner 5. As the FIG. 3 is shown as an exploded view, the border 3 of the filter plate 2 is revealed along with the gaps 3*d*, and the recessed portion 2*c* situated at the gaps 3*d*.

FIG. 4 illustrates the filter plate assembly of FIG. 3 as a plan view seen from the vat side 2*b*. FIG. 4 shows a dashed line, along which the cross-sectional cut views of FIG. 5 and FIG. 6 are seen.

FIG. 5 illustrates the filter plate assembly of FIG. 3 as an exploded cross-sectional cut view along the dashed line illustrated in FIG. 4, whereas FIG. 6 is illustrated in a non-exploded view. These drawings clearly illustrate how the shape of the filtrate vat 4 is formed by the by the filter plate 2 and the border thereof, whereas the vat liner 5 merely acts as a lining following the shape of the actual filtrate vat 4. Moreover, these drawings illustrate how the vat liner 5 is tightly seated together with the filtrate vat 4 and the border 3, and how a grid 10 may be received in the filtrate vat 4, above the vat liner 5.

Figures 7, 8, 9:
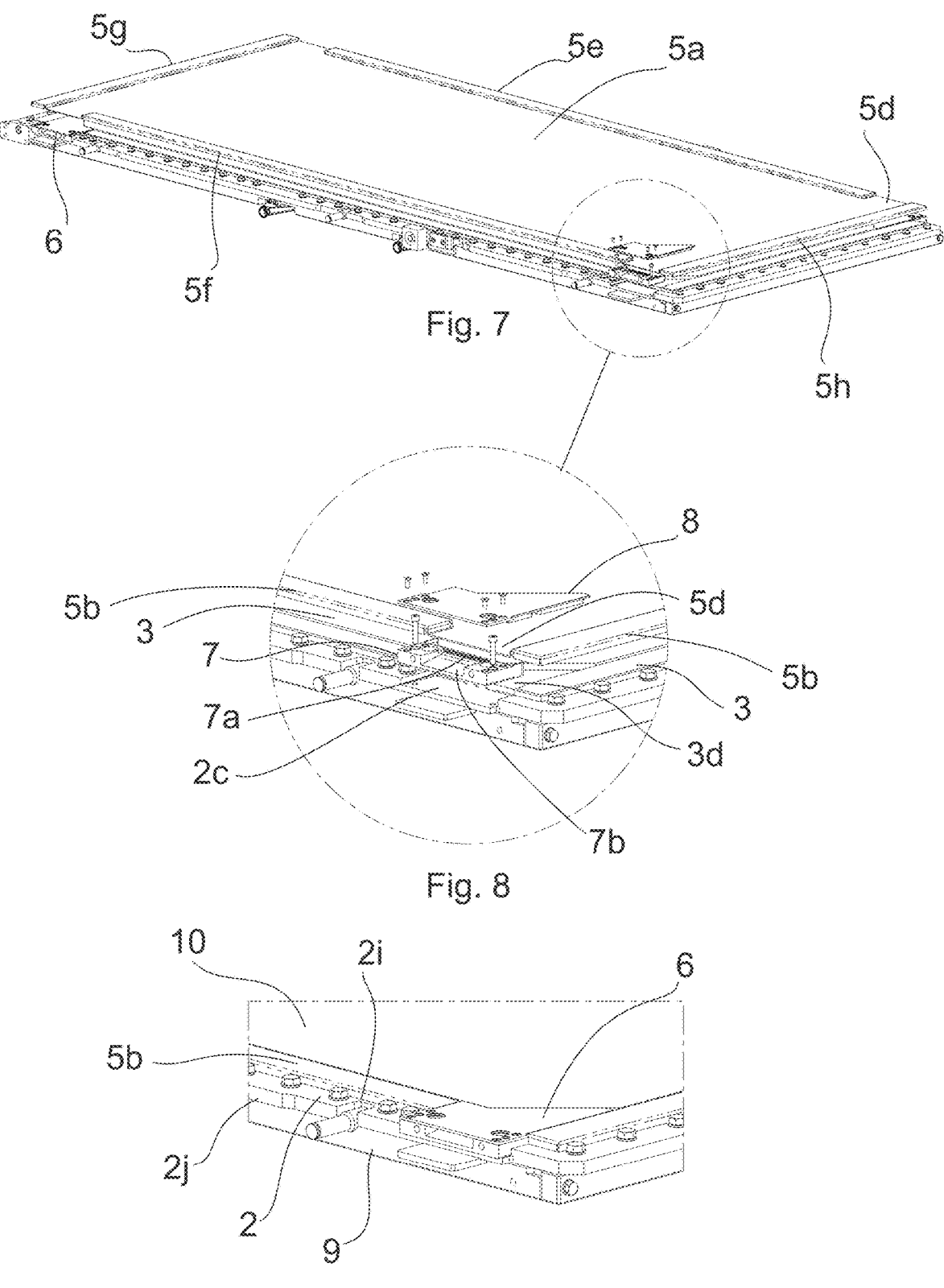
FIG. 7 illustrates the filter plate assembly of FIG. 1, as seen as a semi-exploded perspective view.
FIG. 8 illustrates a detailed view of the outlet piece of FIG. 7.
FIG. 9 illustrates the situation of FIG. 8 in a non-exploded view.

FIG. 7 illustrates the filter plate assembly of FIG. 1, as seen as a semi-exploded perspective view. Particularly, the vat liner 5 and the encircled outlet piece 6 haven illustrated in a displaced, unassembled configuration. FIG. 7 illustrated the vat liner 5, from which the first flank side portion 5*e*, the second flank side portion 5*f*, the first end side portion 5*a* and the second end side portion can be identified forming a generally rectangular shape of the vat liner 5. Furthermore, the border portion 5*b* of the filtrate vat (and particularly the chute 5*c* formed thereunder) is closed towards the gap 3*d*.

FIG. 8 shows a detailed view of the outlet piece encircled in FIG. 7. Particularly, FIG. 8 illustrates how the outlet piece is arranged with respect to the filter plate 2, and the vat liner 5.

The base 7 of the outlet piece 6 is received in a seated manner in the recessed portion 2*b* of the outlet at the gap 3*d* of the border. Particularly, the base 7 is situated between the filter plate 2 and the vat liner 5, such that the vat liner 5 extends onto the base 7. FIG. 8 also illustrates attachment members (i.e. screws, although other attachment member may be envisaged) with which the base 7 is attached to the filter plate 2. Furthermore, the FIG. 8 shows the base having a recessed seat 7*a* against which the vat liner 5 is placed, and the recessed chute 7*b* extending from the recessed seat, slightly elevated therefrom such that the vat liner 5 extends up to the recessed chute 7*b*.

The lid 8 of the outlet piece is situated partially above the vat liner 5 and is attachable to the base 7, such that the vat liner 5 resides between the base 7 and the lid 8, and is clamped therebetween in a sealed manner. It should be noted that the attachment between the lid 8 and the base 7 is situated on a portion of the outlet piece 6 onto which the vat liner 5 does not extend to, thereby separating the point of attachment between the lid 8 and the base 7 from any filtrate running through the drainage route. FIG. 8 also illustrates attachment members (i.e. screws, although other attachment member may be envisaged) with which the lid 8 is attached to the base 8.

FIG. 9 illustrates a detailed view of the outlet piece shown in FIG. 8 in an assembled configuration. It can also be seen from FIG. 9 that the lid 8 extends and seals against border portion 5*b* of the vat liner 5, when attached to the base 7.

Figure 10:
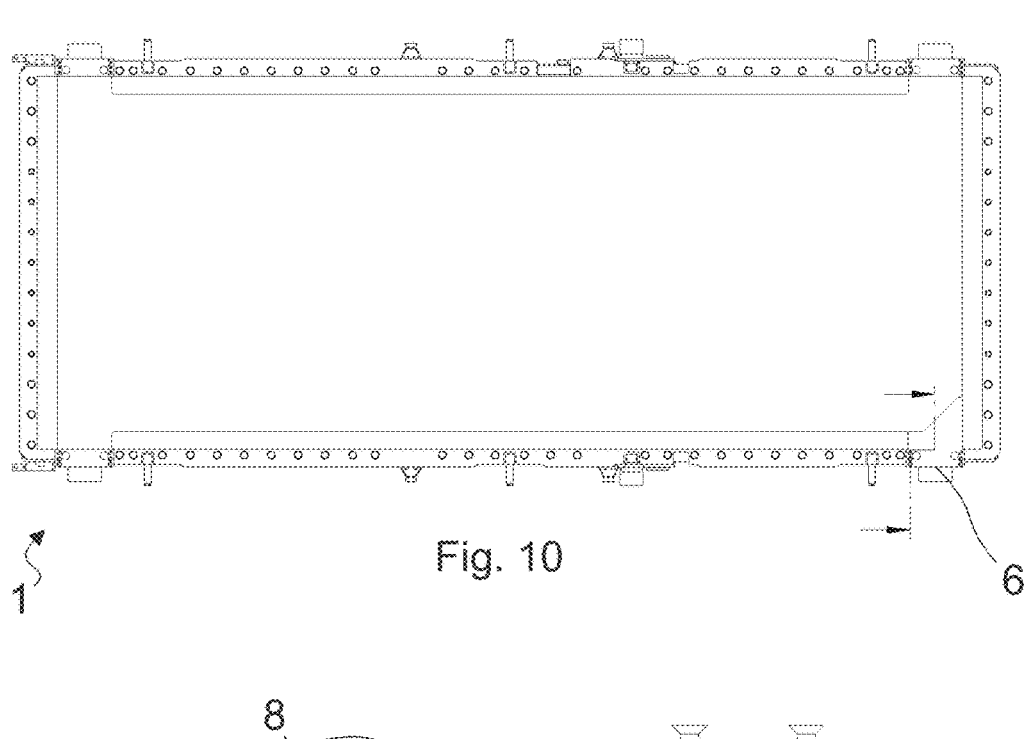
FIG. 10 illustrates the filter plate assembly of FIG. 7 as a plan view.
Figure 11:
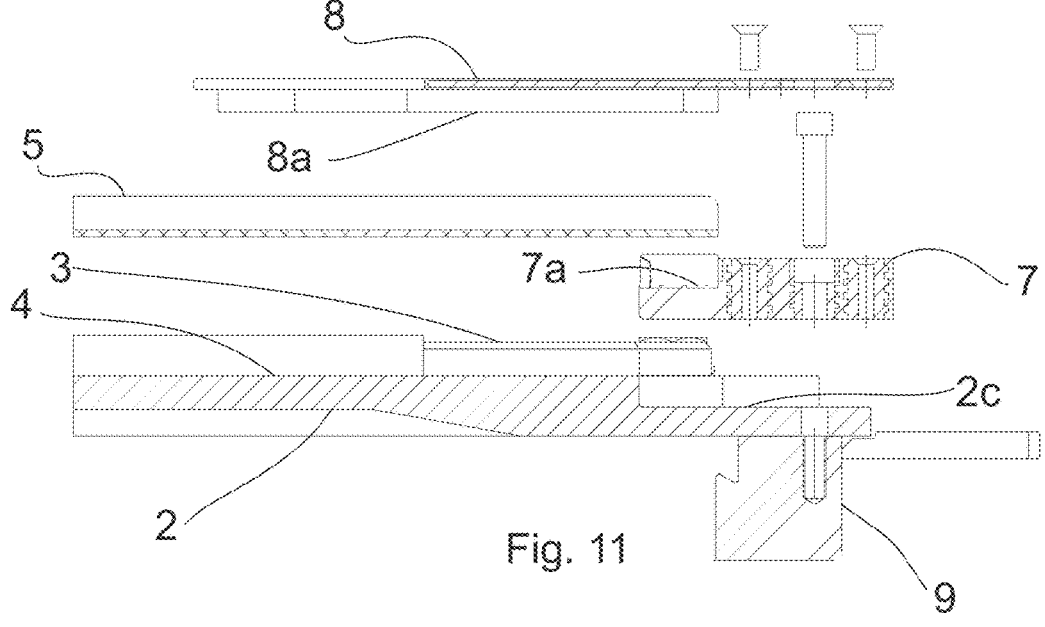
FIG. 11 illustrates an exploded partial cross-sectional cut view of the filter plate assembly of FIG. 7, along the dashed line illustrated in FIG. 10.
Figure 12:
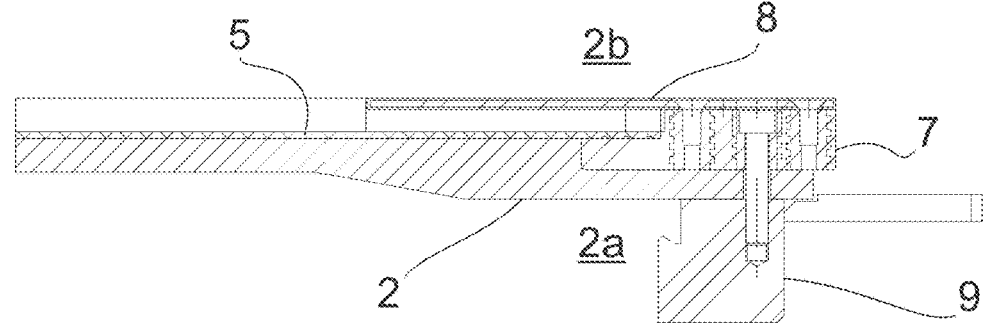
FIG. 12 illustrates the situation of FIG. 11 in a non-exploded view.

FIG. 10 is a plan view of the filter plate assembly 1 of FIG. 7, as seen from the vat side 2*b*. FIG. 11, illustrates an exploded cut view of the outlet piece denoted with the number 6 along the dashed lined shown in FIG. 10, whereas FIG. 12 illustrates the same in a non-exploded configuration. Particularly FIG. 11 and FIG. 12 further illustrating how the base 7 and lid 8 of the outlet piece 6 is arranged with respect to the filter plate 2 and the vat liner 5. Particularly the recessed seat 7*a* of the base 7 can be seen to be flush with the filtrate vat 4 and that the vat liner extends over the recessed seat 7*a*. Furthermore, the ribs 8*a* of the lid can be seen to press against the vat liner 5, thereby securely clamping it in place and sealed against the recessed seat. Furthermore, the base 7 can be attached to the plate frame 9 through the filter plate 2.

LIST OF REFERENCE NUMERALS

1 filter plate assembly
2 filter plate
2*a* frame side
2*b* vat side
2*c* recessed portion
2*d* first flank side
2*e* second flank side
2*f* first end side
2*g* second end side
2*h* attachment holes
2*i* indented portion
2*j* widening portion
3 border
3*a* inner lateral wall
3*b* upper surface
3*c* outer lateral wall
3*d* gap
4 filtrate vat
5 vat liner
5*a* bottom portion
5*b* border portion
5*c* trough
5*d* gap portion
5*e* first flank side portion
5*f* second flank side portion
5*g* first end side portion
5*h* second end side portion
6 outlet piece
7 base
7*a* recessed seat
7*b* recessed chute
8 lid
8*a* rib
9 filter plate frame
10 filtrate vat

The invention claimed is:

1. A filter plate assembly for a horizontal plate and frame filter, comprising a filter plate having a rigid body with a frame side and a chamber side, wherein the filter plate comprises, on the chamber side, a border having an inner lateral wall and an upper surface, the border being elevated for a distance from a portion of the filter plate delimited within the border, and wherein the border is an integral part of the filter plate, wherein a filtrate vat is formed by the filter plate, such that the inner lateral wall of the border forms a lateral wall of the filtrate vat, and a portion of the filter plate delimited by the border forms a bottom of the filtrate vat, and wherein the filter plate assembly further comprises a vat liner having a body, the vat liner being nested within the filtrate vat such that the vat liner extends onto the upper surface of the border, such that the filter plate is separated from filtrate within the filtrate vat by the vat liner.

2. The filter plate assembly according to claim 1, wherein the border has an outer lateral wall, and wherein the vat liner extends onto the lateral outer wall.

3. The filter plate assembly according to claim 2, wherein a trough is formed on the vat liner, running along the perimeter thereof, wherein the border is nested within the trough, and wherein an inside of the trough is hollow and the border is solid.

4. The filter plate assembly according to claim 1, wherein a gap is provided on the border, such that an outlet opening extending laterally through the border is formed, thereby providing a fluid drainage route from the filtrate vat.

5. The filter plate assembly according to claim 4, wherein the vat liner is formed so as to extend into the outlet opening, and to cover the border adjacent to the outlet opening, such that the filter plate is separated from filtrate within the outlet opening by the vat liner.

6. The filter plate assembly according to claim 4, wherein, on the chamber side of the filter plate, a recessed portion of the filter plate situated at the outlet opening is recessed with respect the bottom of the filtrate vat, and wherein the vat liner is spaced apart from the filter plate at the recessed portion in a direction transverse to a general planarity of the filter plate.

7. The filter plate assembly according to claim 4, further comprising a removably fixed outlet piece at least partly nested within the outlet opening, wherein the outlet piece being arranged such that the fluid drainage route runs therethrough.

8. The filter plate assembly according to claim 7, wherein the vat liner extends into the outlet piece.

9. The filter plate assembly according to claim 8, wherein the outlet piece comprises:

a base at least partly nested within a recessed portion of the filter plate, between the filter plate and the vat liner, and a lid on an opposite side of the vat liner with respect to the base, wherein the base is removably fixed to the filter plate assembly, and wherein the lid is a removably fixed to the base such that the vat liner is clamped between the base and the lid and a sealed attachment between the outlet piece and the vat liner is formed, and wherein the filtrate drainage route is formed between the vat liner and the lid.

10. The filter plate assembly according to claim 9, wherein the base of the outlet piece comprises a recessed seat into which a gap portion of the vat liner, corresponding to a gap of the border, is seated, wherein the lid comprises a plurality of spaced apart ribs projecting towards the recessed seat, such that the vat liner is clamped between the recessed seat and the ribs, and is sealed against the recessed seat, and wherein the lid extends over the gap and seals against the border portion of the liner at a position corresponding to the upper surface of the border.

11. The filter plate assembly according to claim 10, wherein the base comprises a recessed chute as a continuation of the recessed seat for conducting filtrate out of the outlet piece.

12. The filter plate assembly according to claim 4, wherein the filter plate is of a generally rectangular shape having a first flank side and a second flank side parallel to the first flank side, and a first end side and a second end side parallel to the first end side, wherein the first and second end sides extend in a direction transverse to a direction in which the first and second flank sides extend, wherein the first and second flank sides have a length greater than that of the first and second end sides, and wherein one or more gaps of the border are formed on either or both of the first flank side and the second flank side.

13. The filter plate assembly according to claim 12, wherein a gap of the border is formed in a corner region between a flank side and an end side.

14. The filter plate assembly according to claim 12, wherein the filter plate comprises one or more lateral indentation portion provided on either or both of the first flank side and the second flank side, wherein the lateral indentation portion is arranged to circumvent suspension elements and/or support elements of a filter plate frame on which the filter plate is supported.

15. The filter plate assembly according to claim 14, wherein the filter plate comprises one or more lateral widening portions provided on either or both of the first flank side and the second flank side, wherein the lateral widening portions are arranged between lateral indentation portions adjacent to the widening portion, wherein the lateral widening portions are arranged to laterally overhang a filter plate frame supporting the filter plate.

16. The filter plate assembly according to claim 2, wherein the filter plate comprises a plurality of attachment holes running along a periphery of the filter plate and extending therethrough, wherein the attachment holes are situated on an outer side of the border with respect to the filtrate vat, such that the attachment holes are not in contact with filtrate within the filtrate vat, when in use.

\* \* \* \* \*